US012347944B2

(12) United States Patent
Bahramiabarghouei et al.

(10) Patent No.: US 12,347,944 B2
(45) Date of Patent: Jul. 1, 2025

(54) ANTENNA SOLUTION FOR MM-WAVE SYSTEMS

(71) Applicant: Telefonaktiebolaget LM Ericsson (publ), Stockholm (SE)

(72) Inventors: Hadi Bahramiabarghouei, Kanata (CA); Dongxun Jia, Ottawa (CA); Xiaochuan Li, Ottawa (CA); Izabela Kurek, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 340 days.

(21) Appl. No.: 17/919,655

(22) PCT Filed: May 26, 2020

(86) PCT No.: PCT/IB2020/054989
§ 371 (c)(1),
(2) Date: Oct. 18, 2022

(87) PCT Pub. No.: WO2021/240214
PCT Pub. Date: Dec. 2, 2021

(65) Prior Publication Data
US 2023/0146159 A1 May 11, 2023

(51) Int. Cl.
*H01Q 9/04* (2006.01)
*H01Q 1/00* (2006.01)
(Continued)

(52) U.S. Cl.
CPC ........... *H01Q 9/0407* (2013.01); *H01Q 1/007* (2013.01); *H01Q 9/30* (2013.01); *H01Q 21/20* (2013.01); *H01Q 25/002* (2013.01)

(58) Field of Classification Search
CPC ........ H01Q 1/007; H01Q 9/0407; H01Q 9/30; H01Q 21/20; H01Q 25/002
See application file for complete search history.

(56) References Cited

U.S. PATENT DOCUMENTS

2003/0043076 A1* 3/2003 Carson .................... H01Q 21/24
343/700 MS
2017/0047665 A1* 2/2017 Yang .................... H01Q 19/005
(Continued)

FOREIGN PATENT DOCUMENTS

EP 1077508 A2 * 2/2001 ............. H01Q 1/007
JP 2014-216887 A 11/2014

OTHER PUBLICATIONS

International Search Report and Written Opinion dated Feb. 15, 2021 issued in PCT Application No. PCT/IB2020/054989, consisting of 17 pages.
(Continued)

*Primary Examiner* — Dameon E Levi
*Assistant Examiner* — Leah Rosenberg
(74) *Attorney, Agent, or Firm* — Weisberg I.P. Law, P.A.

(57) ABSTRACT

Antennas for millimeter wave distributed antenna systems or indoor radio systems are disclosed. According to one aspect, an antenna system is configured to provide a static composite radiation pattern, the static composite radiation pattern having a static broadside radiation pattern and a static off-center-axis radiation pattern. The antenna system includes a first antenna element configured to provide the static broadside radiation pattern, the static broadside pattern encompassing a broadside direction. The antenna system also includes a plurality of additional antenna elements configured in proximity to the first antenna element to provide a static off-broadside radiation pattern, the combination of the static broadside radiation pattern and the static off-broadside radiation pattern providing the static composite radiation pattern. A beamformer is configured to feed the first antenna element and the plurality of additional antenna elements to produce the static off-broadside radiation pattern.

19 Claims, 9 Drawing Sheets

(51) Int. Cl.

| | |
|---|---|
| ***H01Q 9/30*** | (2006.01) |
| ***H01Q 21/20*** | (2006.01) |
| ***H01Q 25/00*** | (2006.01) |

(56) References Cited

U.S. PATENT DOCUMENTS

| | | | | |
|---|---|---|---|---|
| 2021/0036435 | A1* | 2/2021 | Adachi | H04B 7/0617 |
| 2022/0311129 | A1* | 9/2022 | Li | H01Q 5/40 |
| 2023/0420869 | A1* | 12/2023 | Zólomy | H01Q 15/0066 |

OTHER PUBLICATIONS

Huang et al., 60 GHz Multibeam Antenna Array for Gigabit Wireless Communication Networks, IEEE Transactions on Antennas and Propagation, IEEE Service Center, Piscataway, NJ, Dec. 4, 2006, consisting of 3 pages.

Sung et al., 5G Trial Services Demonstration: IFoF-Based Distributed Antenna System in 28 GHz Millimeter-Wave Supporting Gigabit Mobile Services, in Journal of Lightwave Technology, vol. 37, No. 14, Jul. 15, 2019, consisting of 10 pages.

Gu et al., Development, Implementation, and Characterization of a 64-Element Dual-Polarized Phased-Array Antenna Module for 28-GHz High-Speed Data Communications, in IEEE Transactions on Microwave Theory and Techniques, vol. 67, No. 7, Jul. 2019, consisting of 10 pages.

Sadhu et al., 7.2 A 28GHz 32-Element Phased-Array Transceiver IC with Concurrent Dual Polarized Beams and 1.4 Degree Beam-Steering Resolution for 5G Communication, 2017 IEEE International Solid-State Circuits Conference (ISSCC), San Francisco, CA, 2017, consisting of 3 pages.

* cited by examiner

| NAME | THETA | ANG | MAG |
|---|---|---|---|
| m1 | 294.0000 | -66.0000 | 6.6594 |
| m2 | 276.0000 | -84.0000 | -0.7103 |
| m3 | 84.0000 | 84.0000 | 0.4667 |

CURVE INFO

——— dB(GainTotal)
SETUP1: LastAdaptive
FREQ='28Ghz' Phi='-90deg'

------- dB(GainTotal)
SETUP1: LastAdaptive
FREQ='20Ghz' Phi='0deg'

| NAME | THETA | ANG | MAG |
|---|---|---|---|
| m1 | 294.000 | -66.000 | 7.0003 |
| m2 | 276.000 | -84.000 | -0.0477 |
| m3 | 84.000 | 84.000 | 0.0748 |

CURVE INFO

——— dB(GainTotal)
SETUP1: LastAdaptive
FREQ='28Ghz' Phi='-90deg'

------- dB(GainTotal)
SETUP1: LastAdaptive
FREQ='28Ghz' Phi='0deg'

| NAME | THETA | ANG | MAG |
|---|---|---|---|
| m1 | 300.0000 | -60.0000 | 6.1486 |
| m2 | 283.0000 | -77.0000 | 0.4198 |
| m3 | 77.0000 | 77.0000 | 0.5566 |

| CURVE INFO |
|---|
| ——— dB(GainTotal)<br>SETUP1: SWEEP<br>FREQ='28Ghz' Phi='-90deg' |
| ------- dB(GainTotal)<br>SETUP1: SWEEP<br>FREQ='28Ghz' Phi='0deg' |

| NAME | THETA | ANG | MAG |
|---|---|---|---|
| m1 | 300.0000 | -60.0000 | 6.3175 |
| m2 | 283.0000 | -77.0000 | 0.2200 |
| m3 | 77.0000 | 77.0000 | 0.3017 |

| CURVE INFO |
|---|
| ——— dB(GainTotal)<br>SETUP1: SWEEP<br>FREQ='28Ghz' Phi='-90deg' |
| ------- dB(GainTotal)<br>SETUP1: SWEEP<br>FREQ='28Ghz' Phi='0deg' |

ANTENNA SOLUTION FOR MM-WAVE SYSTEMS

CROSS-REFERENCE TO RELATED APPLICATION

This application is a Submission Under 35 U.S.C. § 371 for U.S. National Stage Patent Application of International Application Number: PCT/IB2020/054989, filed May 26, 2020 entitled "ANTENNA SOLUTION FOR MM-WAVE SYSTEMS," the entirety of which is incorporater herein by reference.

TECHNICAL FIELD

This disclosure relates to wireless communication and in particular, to antennas for millimeter wave distributed antenna systems or indoor radio systems.

BACKGROUND

With evolving wireless networks such as Fifth Generation (5G) (also called New Radio), radio units (RU) with higher frequency such as mm-Wave frequencies are required to be able to support higher modulation bandwidth. Currently, there is no good solution for an antenna and RF front-end of a mm-Wave access point for indoor applications. Recently, for outdoor products, the phased array antenna has been proposed to steer beams toward wireless device (WDs). However, distributed solutions for indoor applications, such as distributed antenna systems (DAS) or indoor radio systems (RDS), would not greatly benefit from the phased array system, which has several drawbacks.

A first drawback to a phased array system is, that since several remote radio heads deployed in several locations are combined into one common path to provide one instantaneous bandwidth supported by a baseband modem, each antenna head points in a different direction when communicating with a wireless device (WD). As a result, the signal to noise ratio (SNR) in overlapping cells are degraded as compared to sub-6 GHz products using a fixed radiation pattern antenna. The fixed pattern is such that the WD is heard by a few antennas. This is not the case for the phased array antennas. Second, since the phased array antenna is directional, the antenna units used for a mm-Wave phased array system require searching and tracking states in order to find and service the WDs within the area covered by the cell. This adds complexity to the modem and increases latency of the radio system.

To solve some of these problems, especially for ceiling installations, a fixed radiation antenna pattern is used for high frequencies such as mm-Wave frequencies. However, FIGS. 1 and 2 show that for a fixed radiation pattern 2 of a single known antenna mounted on a ceiling 4, the path loss increases toward the edge of the cell 6. Further, because of the existing output power limitations of the power amplifier at mm-Wave frequencies or higher frequencies, the omni-directional or directional single antenna radiation pattern such as transmitted by a patch antenna face constraints.

SUMMARY

Some embodiments advantageously provide antennas for millimeter wave distributed antenna systems or indoor radio systems. Some embodiments employ a static antenna array using a beamformer without scanning in order to achieve the desired antenna radiation pattern. Such arrays can provide enough power to exceed the receiver sensitivity of the WD. Additionally, this achieved gain can be helpful to receiver sensitivity of the access point for the uplink.

According to one aspect, an antenna system is configured to provide a static composite radiation pattern, the static composite radiation pattern having a static broadside radiation pattern and a static off-center-axis radiation pattern. The antenna system includes a first antenna element configured to provide the static broadside radiation pattern, the static broadside pattern encompassing a broadside direction. The antenna system also includes a plurality of additional antenna elements configured in proximity to the first antenna element to provide a static off-broadside radiation pattern, the combination of the static broadside radiation pattern and the static off-broadside radiation pattern providing the static composite radiation pattern. A beamformer is configured to feed the first antenna element and the plurality of additional antenna elements to produce the static off-broadside radiation pattern.

According to this aspect, in some embodiments, the beamformer has directional beam steering capabilities. In some embodiments, the static off-broadside radiation pattern has a null in the broadside direction and the static broadside radiation pattern does not have a null in the broadside direction. In some embodiments, the static broadside radiation pattern has a first angular range associated therewith that includes the broadside direction, and the static off-broadside radiation pattern has a second angular range associated therewith that does not include the broadside direction, the second angular range encompassing angles not included in the first angular range and the first angular range encompassing angles not included in the second angular range. In some embodiments, the first angular range is defined by a first 3 dB half power point and the second angular range is defined by a second 3 dB half power point. In some embodiments, the first antenna element is a patch antenna element having a surface normal to the broadside direction. In some embodiments, at least one of the plurality of additional antenna elements is a patch antenna having a surface at an acute angle from the broadside direction. In some embodiments, the plurality of additional antenna elements are disposed to surround the first antenna element so that the static off-broadside radiation pattern is symmetrical about the broadside direction. In some embodiments, the broadside radiation pattern is symmetrical about the broadside direction. In some embodiments, the static off-broadside radiation pattern is beamformed to be static and symmetrical about the broadside direction.

According to another aspect, an antenna system configured to provide a fixed radiation pattern is provided. The antenna system includes a first antenna element configured to provide a peak gain in a broadside direction, and a plurality of additional antenna elements, each additional antenna element oriented and directional to have a peak gain in an off-broadside direction where a gain of the first antenna element falls off from the peak gain in the broadside direction. The antenna system also includes a beamformer configured to feed the first antenna element and the plurality of additional antenna elements to produce a fixed beam that has a donut pattern surrounding the broadside direction and has at least one peak gain in an off-broadside direction.

According to this aspect, in some embodiments, the beamformer has directional beam steering capabilities. In some embodiments, the plurality of additional antenna elements are disposed to surround the first antenna element. In some embodiments, the first antenna element is a patch antenna and the plurality of additional antenna elements are monopole antenna elements. In some embodiments, the beamformer is configured to provide a signal to each of the plurality of additional antenna elements, each signal having a same amplitude and phase. In some embodiments, the antenna system further includes a plurality of power amplifiers coupled to the beamformer, the beamformer configured to distribute power from the power amplifiers to the plurality of additional antenna elements.

According to yet another embodiments, an antenna system is configured to provide a fixed radiation pattern that is rotationally symmetric about a broadside direction and has a gain over an angular sector of greater than 120 degrees that includes the broadside direction. The antenna system includes a broadside antenna element configured to provide a broadside radiation pattern with a higher gain in the broadside direction than a gain of the broadside antenna element at 120 degrees. The antenna system also includes a beamformer having beam shaping capabilities and configured to feed the broadside element and an array of additional antenna elements to provide a fixed rotationally symmetric off-broadside radiation pattern to extend coverage of the antenna system to the angular sector of greater than 120 degrees. The array of additional antenna elements are disposed around the broadside antenna element, each antenna element of the array of additional antenna elements having a directional radiation pattern pointed toward an off-broadside direction to produce a composite beam that has a donut pattern. In some embodiments, the beamformer feeds each antenna element of the array of additional antenna elements with a same phase and amplitude. In some embodiments, the fixed rotationally symmetric off-broadside radiation pattern has a null in the broadside direction and the broadside radiation pattern does not have a null in the broadside direction. In some embodiments, the broadside radiation pattern has a first angular range associated therewith that includes the broadside direction, and the fixed rotationally symmetric off-broadside radiation pattern has a second angular range associated therewith that does not include the broadside direction, the second angular range encompassing angles not included in the first angular range and the first angular range encompassing angles not included in the second angular range.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
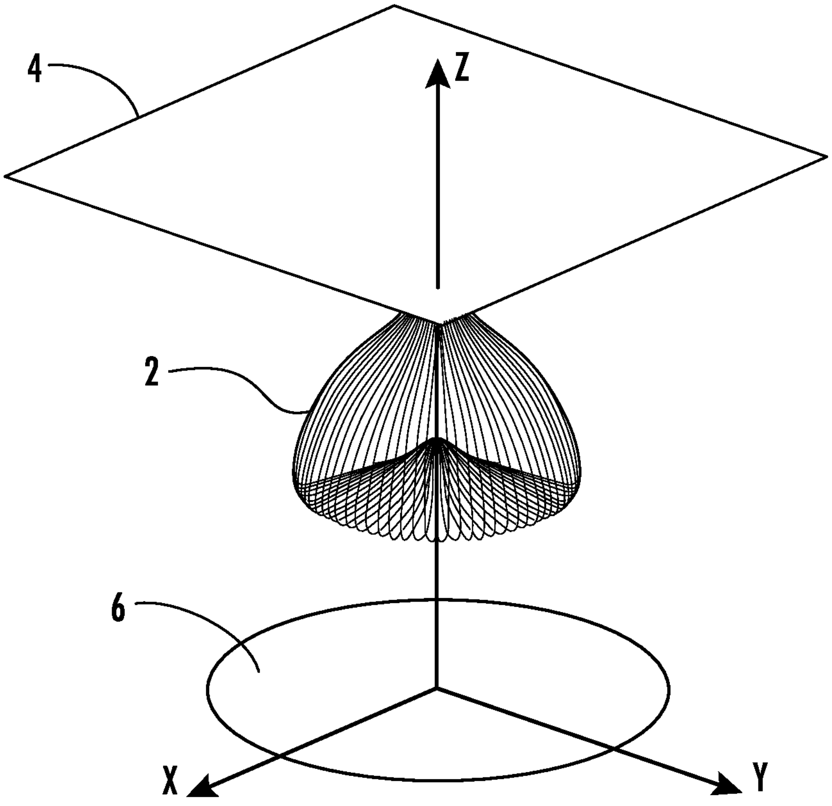
FIG. 1 is an illustration of a radiation pattern of a known antenna system.
Figure 2:
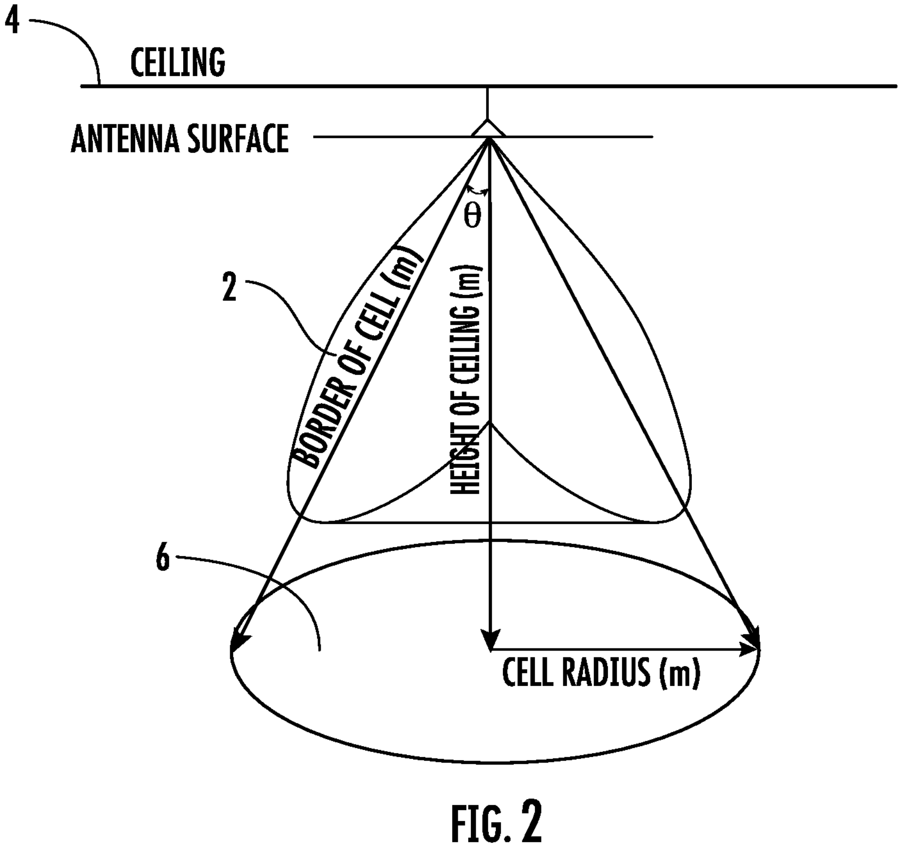
FIG. 2 further illustrates the extent of the radiation pattern of FIG. 1.

Before describing in detail exemplary embodiments, it is noted that the embodiments reside primarily in combinations of apparatus components and processing steps related to antennas for millimeter wave distributed antenna systems or indoor radio system.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements.

Some embodiments provide antennas for millimeter wave distributed antenna systems or indoor radio systems. To overcome the problems described above, some embodiments introduce a shaped radiation pattern which provides higher gain at the cell edge compared with known fixed antennas. In this way, a higher equivalent isotropic radiated power (EIRP) is placed in locations which would otherwise have more path loss.

Figure 3:
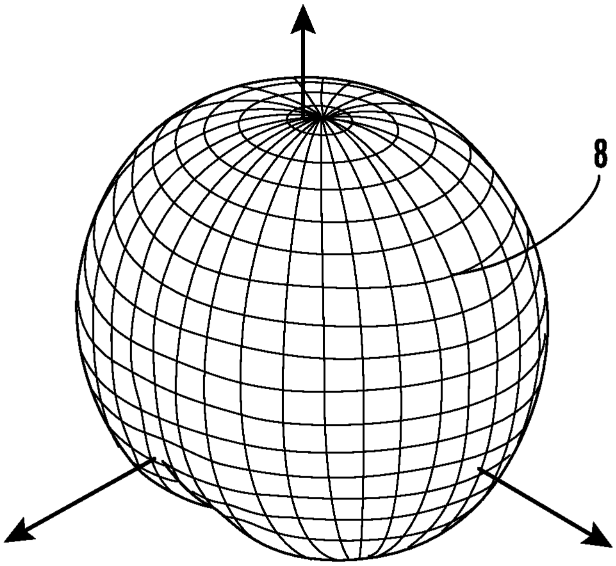
FIG. 3 is a three-dimensional radiation pattern of the known antenna system of FIG. 1.
Figure 4:
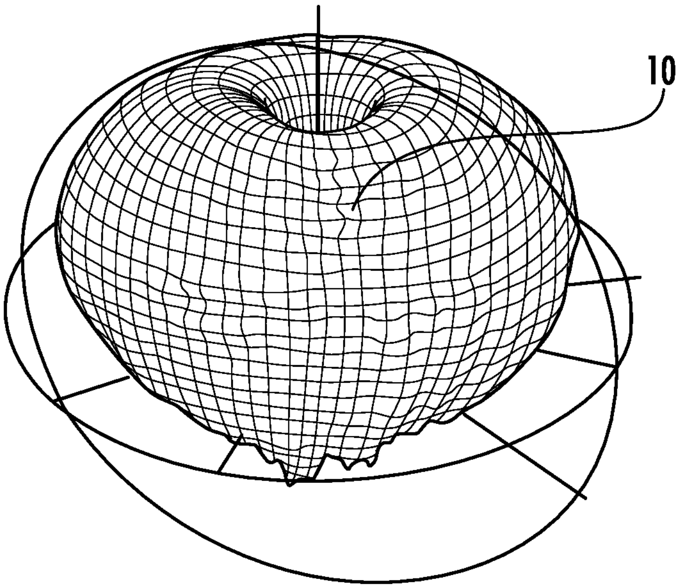
FIG. 4 is a three dimensional donut shaped radiation pattern generated according to principles set forth herein.

Referring again to the drawings in which like reference designators refer to like elements, FIG. 3 shows an antenna radiation pattern 8 of a patch antenna commonly used in the current sub-6 GHz DAS/RDS systems and FIG. 4 shows a radiation pattern 10 of antennas arranged in an array as described below. In the radiation pattern 10 of FIG. 4, the maximum gain is pushed toward the cell edges in order to offset the higher pathloss existing at the cell edges. Additionally, an array of power amplifiers can be used to feed elements of the antenna array, providing extra gain because of the summation of the radiation patterns of the individual antennas of the antenna array, providing flexibility in the power amplifier design.

By using the arrangements of antenna elements described below, the coverage of the radio is increased. Consequently, the signal to noise ratio (SNR) improvement at the cell boarders results as compared to known arrangements.

Figure 5:
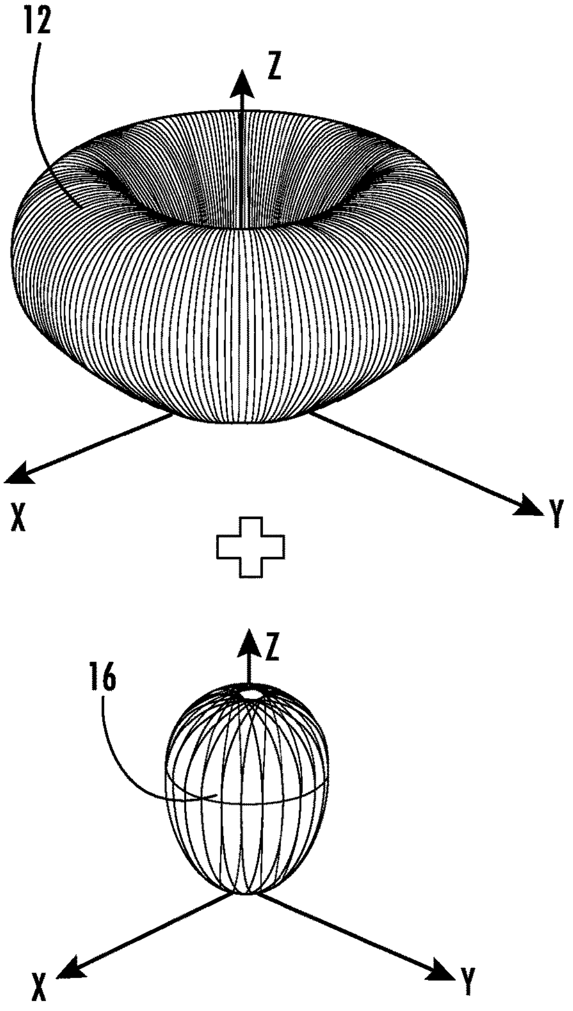
FIG. 5 illustrates a combining of a donut radiation pattern with a broadside radiation pattern.

Two example arrangements to realize the goal of higher gain at the cell edges, while providing high gain at broadside, are described herein. In the first arrangement, the targeted radiation pattern is achieved by summation of two different radiation patterns. The first radiation pattern, shown at the top of FIG. 5, is a donut radiation pattern 12 that has a highest gain pointing at the edge of the targeted cell and is rotationally symmetric about the Z axis (the broadside direction. This pattern can be obtained by a dipole antenna 13, as shown in the top of FIG. 6, or other type of antennas such as small loop antenna.

Figure 6:
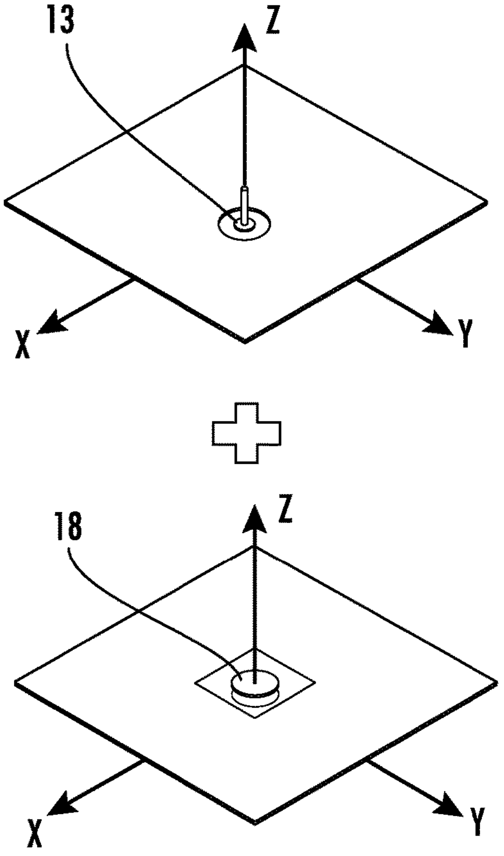
FIG. 6 illustrates the antenna elements that generate the radiation patterns of FIG. 5.

The second radiation pattern 16 shown at the bottom of FIG. 5 points at broadside and can be achieved by a patch antenna, as shown in the bottom of FIG. 6, or other types of antennas such as an aperture antenna, a Vivaldi antenna, etc. The second radiation pattern has high broadside gain where there is a null in the donut radiation pattern shown at the top of FIG. 5. Since the broadside radiation pattern shown at the bottom of FIG. 5 provides broadside gain with less pathloss, one broadside antenna is enough to provide adequate gain at broadside. Note that the resultant radiation pattern is static. Static, as used herein, means spatially static, not temporally static.

Figure 7:
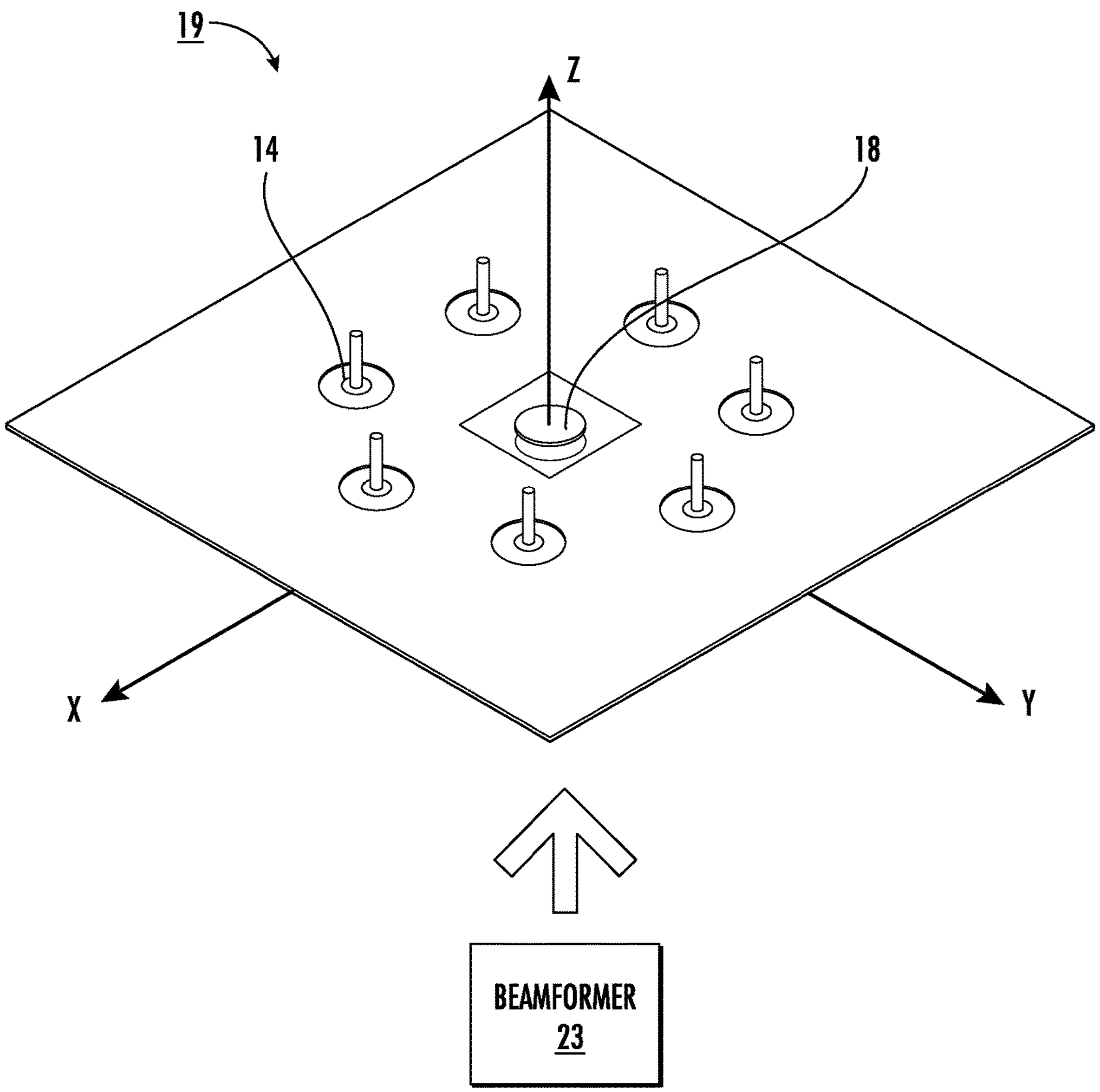
FIG. 7 illustrates an antenna system constructed according to principles set forth herein.

FIG. 7 shows an embodiment to achieve the donut pattern and high broadside gain. A circular array of seven monopole antennas 14 provide the donut radiation pattern 12 shown in FIG. 5 and one centrally located broadside radiator 18. e.g., patch antenna, is used to provide a high gain radiation pattern 16 at broadside, as shown in FIG. 5. Note that although seven monopole antennas 14 are shown, more or fewer antenna 14 elements may be included. Further note that although monopole antennas are shown, other types of antennas may be employed to provide a donut shape radiation pattern. Also shown in FIG. 7 is a beamformer 23, configured to feed the antenna elements of the circular ring of antenna elements 14 and the broadside radiator 18. The beamformer and feed network (not shown) feed all of the antennas 14 and 18, coherently (that is, all antennas are fed in-phase.)

Figure 8:
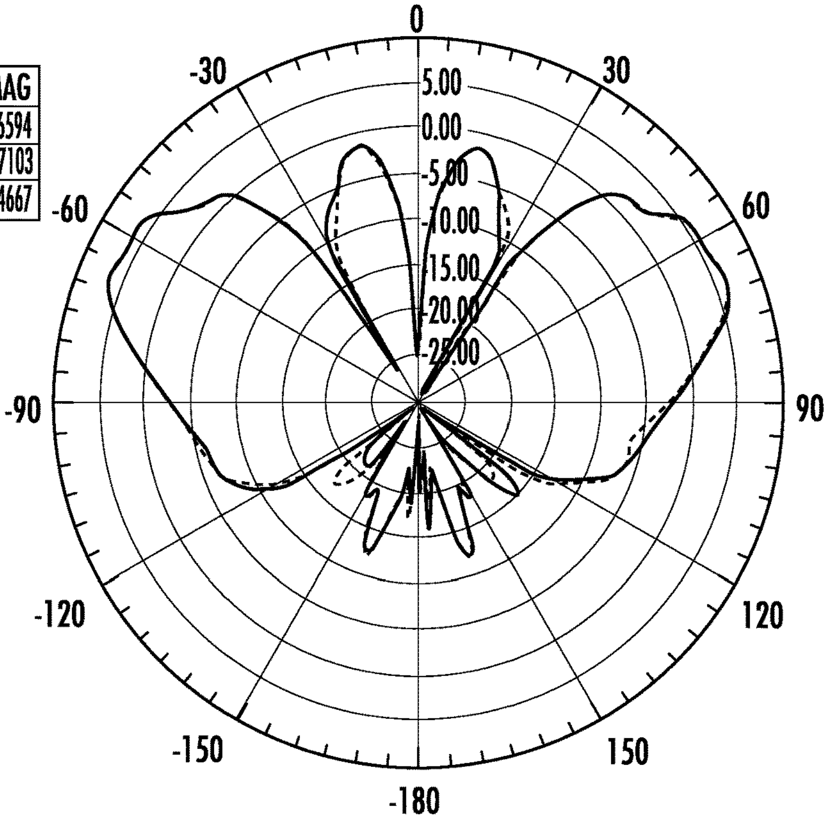
FIG. 8 is an antenna pattern of the circular array of antenna elements shown in FIG. 7.
Figure 9:
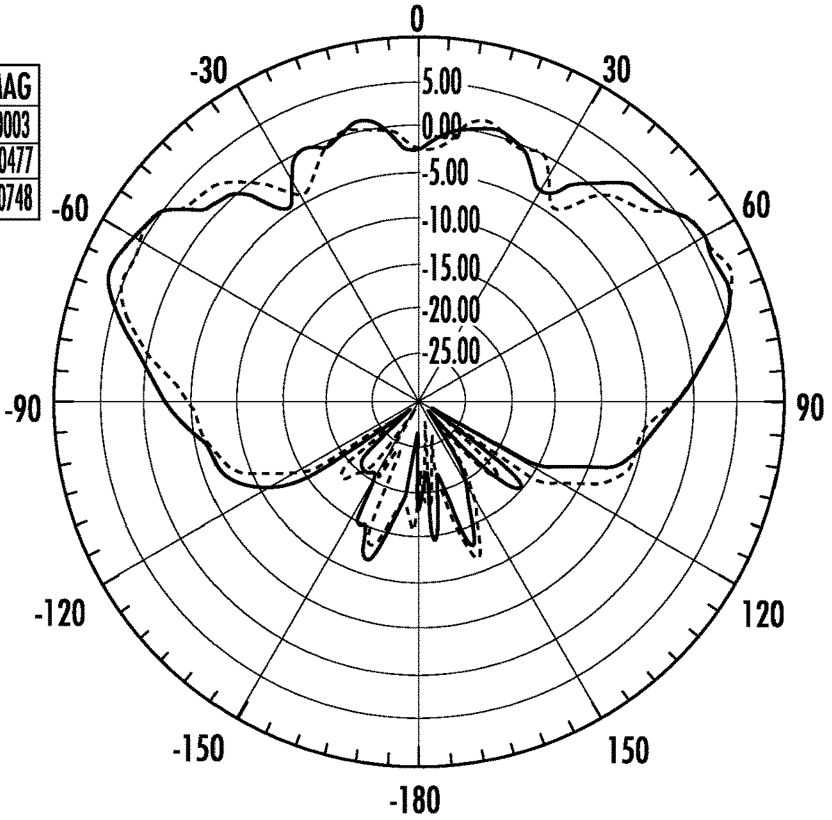
FIG. 9 is an antenna pattern resulting from adding the broadside antenna element of FIG. 7 to the circular array of antenna elements shown in FIG. 7.

FIG. 8 shows the radiation pattern of the circular ring of monopole antennas which provide high gain at angles away from the broadside direction. However, a null exists at broadside. FIG. 9 shows the radiation pattern of the combined set of the circular ring of antennas 14 and the broadside radiator 18. e.g., patch antenna, when all of these antennas are fed the same signal, coherently. Comparing FIGS. 8 and 9, it can be seen that the addition of the broadside radiator 18 in the center of the ring of monopole antennas 14 provides high gain at the nulls of the radiation pattern of the circular ring of antennas 14. Thus, rather than use a single antenna having a radiation pattern that has a null at broadside and insufficient power at off-broadside angles, mm-Wave antennas with fixed radiation patterns are grouped in such a way as to provide full coverage at broadside and off-broadside angles. Further, since the antenna pattern is fixed, bean steering and tracking is not used. Consequently, the electronics to implement a scanning beam are not necessary, thus resulting in simplification of design and lower cost.

Figure 10:
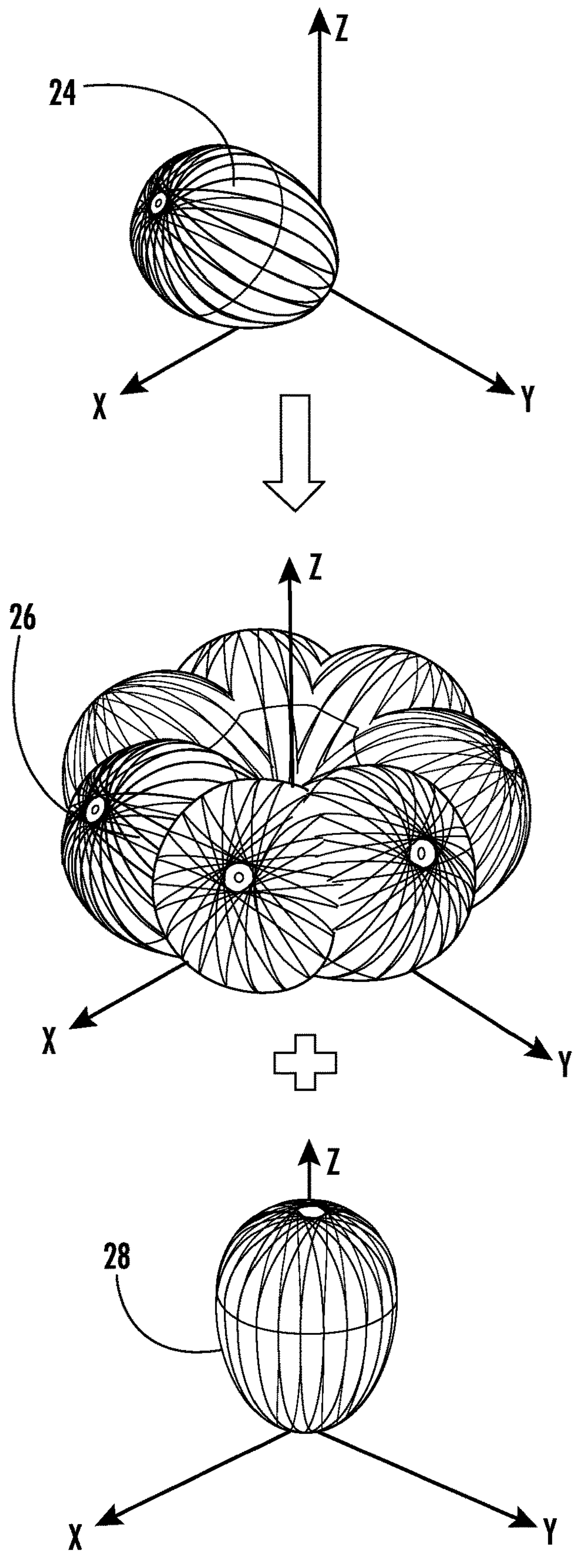
FIG. 10 illustrates combining antenna patterns to produce a composite radiation pattern that has high gain at broadside and at cell edges.

FIG. 10 shows a second example of a way the targeted radiation pattern shown in FIG. 4 can be achieved by copying and rotating the radiation pattern 24 of a tilted directional antenna, the copy and rotation of this antenna pattern being illustrated as the radiation pattern 26 at the center of FIG. 10. When combined, these antenna radiation patterns 26 merge into the donut radiation pattern 12 of FIG. 5. Thus, the tilted radiation patterns 26 provided by the copying and rotating of antenna elements produces high gain at off-broadside angles pointing to an edge of the cell. The rotated copies are maintaining symmetrically around z axis (the broadside direction). The antenna elements creating the donut pattern may be patches, Vivaldi antennas, aperture antennas, etc. The tilted radiation patterns 26 can be combined with a broadsided pattern 28 to produce a composite radiation pattern that has high gain at broadside and at the cell edges (large theta).

Figure 11:
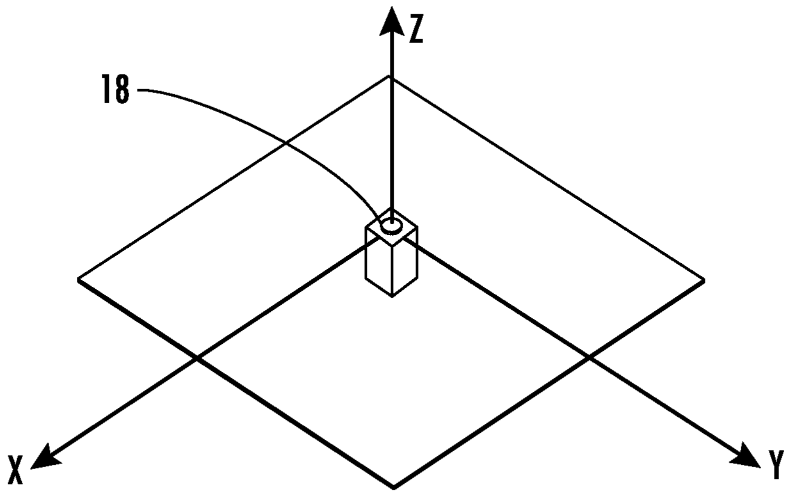
FIG. 11 is a patch antenna providing a broadside directional radiation pattern.
Figure 12:
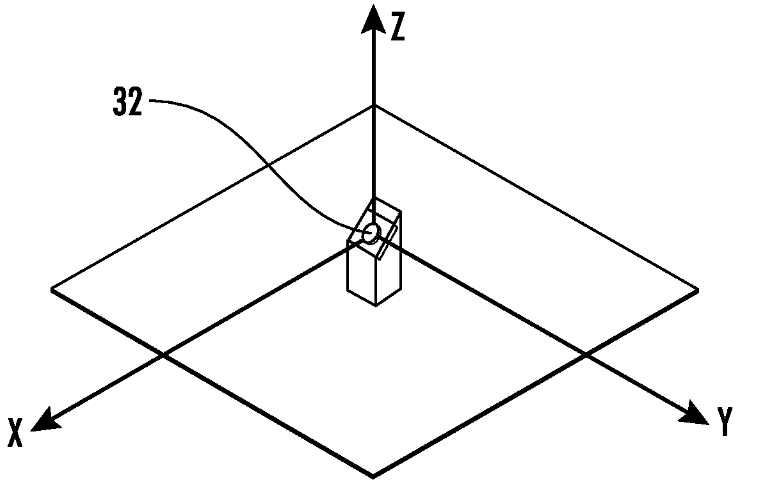
FIG. 12 is a patch antenna tilted at an acute angle and used to contribute to a donut pattern.
Figure 13:
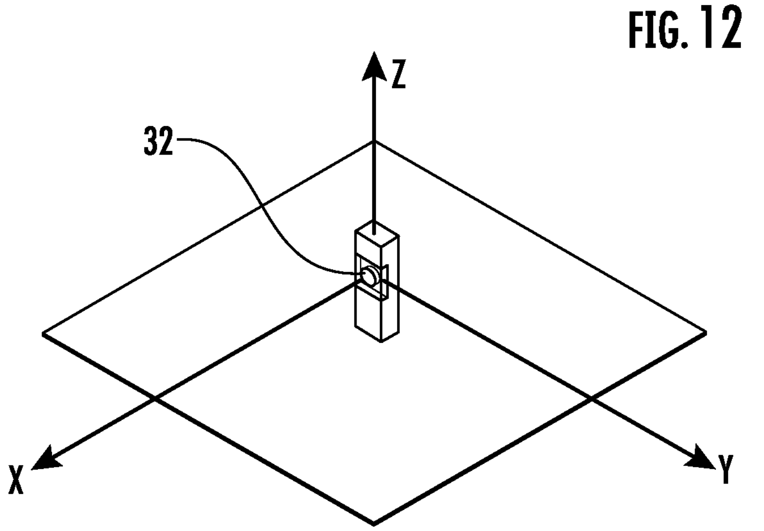
FIG. 13 is a patch antenna facing 90 degrees from broadside and used to contribute to a donut pattern.

The tilted radiation pattern 24 can be obtained by physically tilting a collection of antennas which have a directional radiation pattern such as patch, Vivaldi, aperture, etc. FIG. 11 shows a patch antenna serving as a broadside radiator 18 providing the broadside radiation pattern. FIG. 12 shows a tilted patch antenna element 32 providing a contribution to the donut pattern. FIG. 13 shows a patch antenna element 32 facing a direction 90 degrees from broadside, which may also provide a contribution to the donut pattern.

Figure 14:
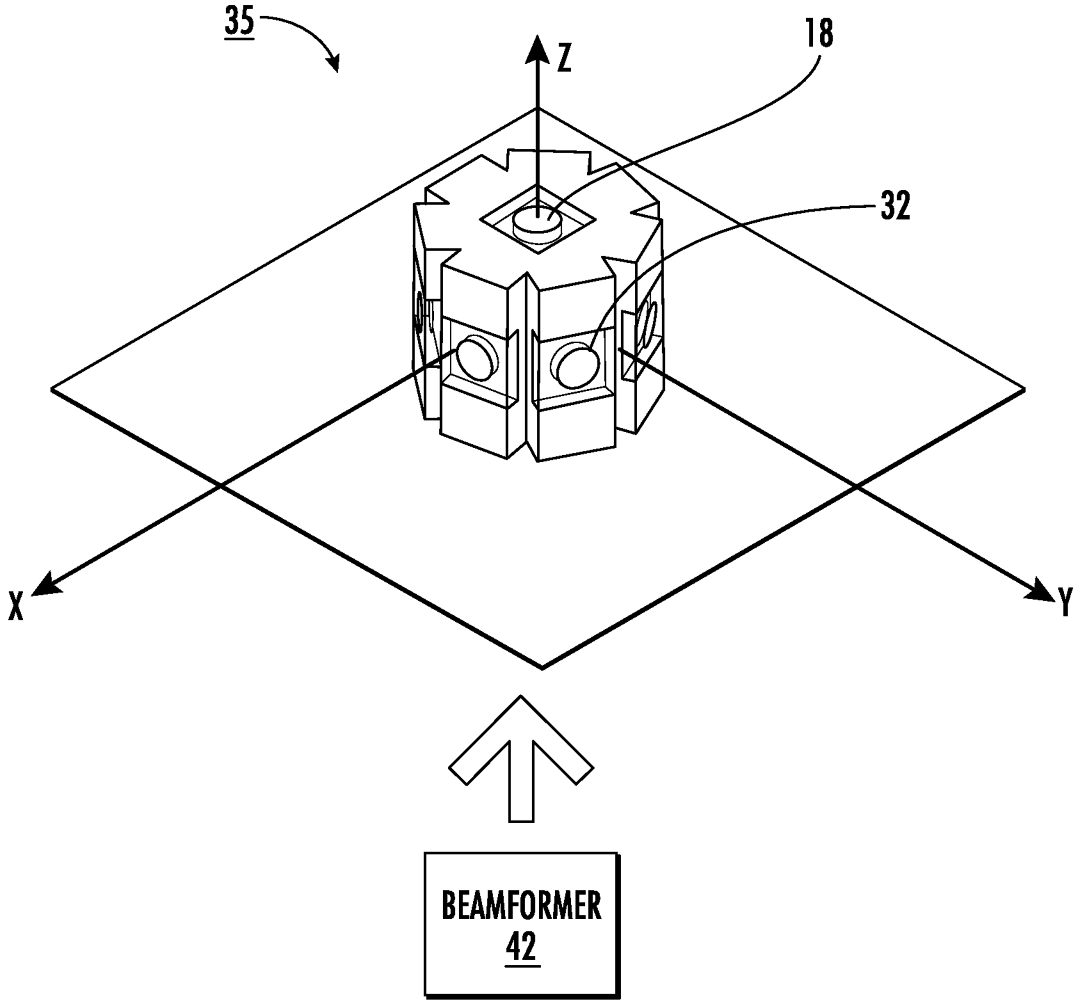
FIG. 14 is an antenna system resulting in a composite radiation pattern that has high gain at broadside and at cell edges.

FIG. 14 shows an embodiment 36 where the circular ring of antenna elements 32 are facing 90 degrees from broadside and encircle the broadside radiator 18 which is centered within the ring and facing broadside. Note that the patch antenna elements 32 may have the same size, shape, distance above the ground plane and dielectric substrate as broadside radiator 18, e.g., a patch antenna.

Figure 15:
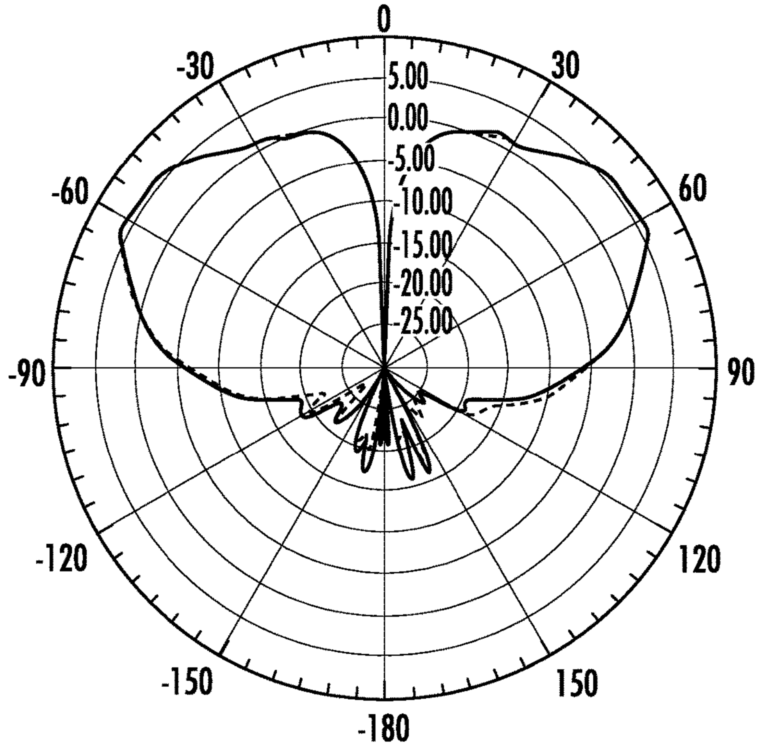
FIG. 15 is an antenna pattern of the circular array of antenna elements shown in FIG. 14.
Figure 16:
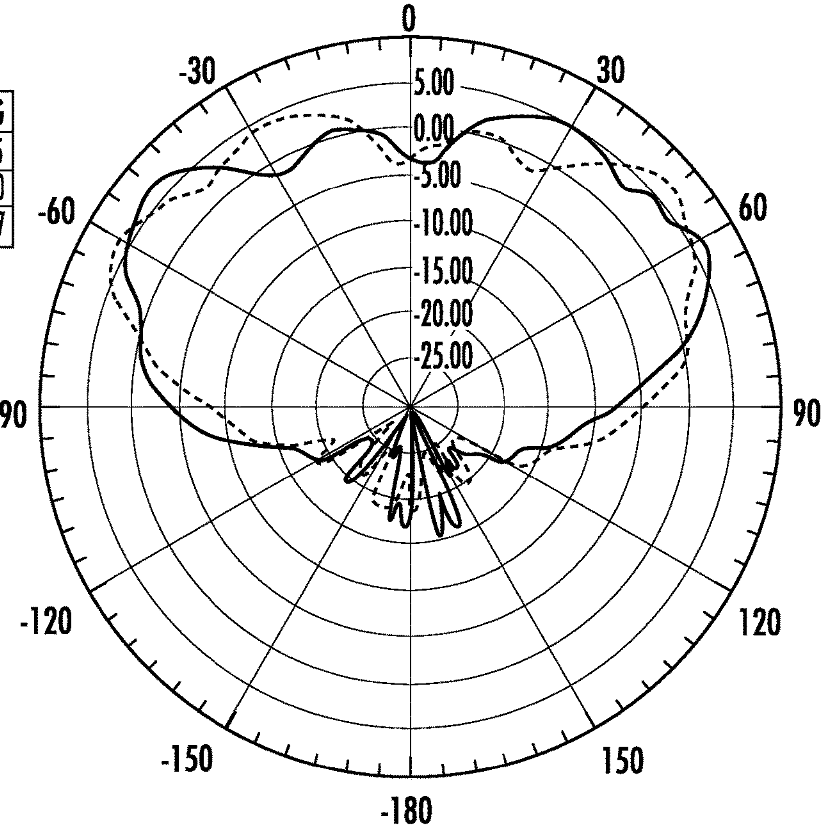
FIG. 16 is an antenna pattern resulting from adding the broadside antenna element of FIG. 14 to the circular array of antenna elements shown in FIG. 14.

FIG. 15 shows the radiation pattern of the circular ring of antenna elements 32 in FIG. 14 without the broadside radiator 18. FIG. 16 shows the antenna pattern of the circular ring of antenna elements 32 of FIG. 14 plus the radiation pattern of the broadside radiator 18. Also shown in FIG. 14 Is a beamformer 42, configured to feed the antenna elements 32 of the circular ring and the broadside radiator 18. The beamformer 42 and feed network (not shown) feed all of the antennas 32 and 18, coherently (that is, all antennas are fed in-phase.) Note that the beamformer 42 may or may not be the same as beamformer 23 depending on the implementation.

In some embodiments, radiation patterns of the antennas of FIG. 14 and the antennas of FIG. 7 may be beamformed using the same beamformer that is used for scanning arrays, only the beamformer is not directed to form a beam that is scanned. This saves design and implementation costs. The combination of antennas as described above may be used for indoor applications such as for distributed radio systems such as DAS and RDS systems. It extends the area covered by the cell as compared to omni-directional or directional patterns. The antennas disclosed herein are suitable for high frequency applications such as mm-Wave applications. The solution described herein offer an alternative to more complex solutions involving phased array antennas and analogue/digital beam forming and beam steering. This solution extends the development design flexibility and simplifies the modem (digital unit) for the higher frequency range of mmWaves.

According to one aspect, an antenna system 19, 35 is configured to provide a static composite radiation pattern, the static composite radiation pattern having a static broadside radiation pattern and a static off-center-axis radiation pattern. The antenna system includes a first antenna element 18, configured to provide the static broadside radiation pattern, the static broadside pattern encompassing a broadside direction. The antenna system 19, 35 also includes a plurality of additional antenna elements 14, 32 configured in proximity to the first antenna element 18, to provide a static off-broadside radiation pattern, the combination of the static broadside radiation pattern and the static off-broadside radiation pattern providing the static composite radiation pattern. A beamformer 42 is configured to feed the first antenna element 18 and the plurality of additional antenna elements 14, 32 to produce the static off-broadside radiation pattern.

According to this aspect, in some embodiments, the beamformer 42 has directional beam steering capabilities. In some embodiments, the static off-broadside radiation pattern has a null in the broadside direction and the static broadside radiation pattern does not have a null in the broadside direction. In some embodiments, the static broadside radiation pattern has a first angular range associated therewith that includes the broadside direction, and the static off-broadside radiation pattern has a second angular range associated therewith that does not include the broadside direction, the second angular range encompassing angles not included in the first angular range and the first angular range encompassing angles not included in the second angular range. In some embodiments, the first angular range is defined by a first 3 dB half power point and the second angular range is defined by a second 3 dB half power point. In some embodiments, the first antenna element 18 is a patch antenna element having a surface normal to the broadside direction. In some embodiments, at least one of the plurality of additional antenna elements 14, 32 is a patch antenna having a surface at an acute angle from the broadside direction. In some embodiments, the plurality of additional antenna elements 14, 32 are disposed to surround the first antenna element 18, so that the static off-broadside radiation pattern is symmetrical about the broadside direction. In some embodiments, the broadside radiation pattern is symmetrical about the broadside direction. In some embodiments, the static off-broadside radiation pattern is beamformed to be static and symmetrical about the broadside direction.

According to another aspect, an antenna system 19, 35 configured to provide a fixed radiation pattern is provided. The antenna system 19, 35 includes a first antenna element 18, configured to provide a peak gain in a broadside direction, and a plurality of additional antenna elements 14, 32, each additional antenna element 14, 32 oriented and directional to have a peak gain in an off-broadside direction where a gain of the first antenna element falls off from the peak gain in the broadside direction. The antenna system 19, 35 also includes a beamformer 42 configured to feed the first antenna element 18 and the plurality of additional antenna elements 14, 32 to produce a fixed beam that has a donut pattern surrounding the broadside direction and has at least one peak gain in an off-broadside direction.

According to this aspect, in some embodiments, the beamformer 42 has directional beam steering capabilities. In some embodiments, the plurality of additional antenna elements 14, 32 are disposed to surround the first antenna element 18. In some embodiments, the first antenna element 18 is a patch antenna and the plurality of additional antenna elements 14, 32 are monopole antenna elements. In some embodiments, the beamformer 42 is configured to provide a signal to each of the plurality of additional antenna elements 14, 32, each signal having a same amplitude and phase. In some embodiments, the antenna system 19, 35 further includes a plurality of power amplifiers (not shown) coupled to the beamformer 42, the beamformer 42 configured to distribute power from the power amplifiers to the plurality of additional antenna elements as 14, 32 as well as the first antenna element 18.

According to yet another embodiments, an antenna system 19, 35 is configured to provide a fixed radiation pattern that is rotationally symmetric about a broadside direction and has a gain over an angular sector of greater than 120 degrees that includes the broadside direction. The antenna system 19, 35 includes a broadside radiator 18 configured to provide a broadside radiation pattern with a higher gain in the broadside direction than a gain of the broadside radiator 18, i.e., antenna element, at 120 degrees. The antenna system 19, 35 also includes a beamformer 42 having beam shaping capabilities and configured to feed the broadside radiator 18 and an array of additional antenna elements 14, 32 to provide a fixed rotationally symmetric off-broadside radiation pattern to extend coverage of the antenna system to the angular sector of greater than 120 degrees. The array of additional antenna elements 14, 32 are disposed around the broadside radiator 18, each antenna element of the array of additional antenna elements 14, 32 having a directional radiation pattern pointed toward an off-broadside direction to produce a composite beam that has a donut pattern.

In some embodiments, the beamformer 42 feeds each antenna element of the array of additional antenna elements 14, 32 with a same phase and amplitude. In some embodiments, the fixed rotationally symmetric off-broadside radiation pattern has a null in the broadside direction and the broadside radiation pattern does not have a null in the broadside direction. In some embodiments, the broadside radiation pattern has a first angular range associated therewith that includes the broadside direction, and the fixed rotationally symmetric off-broadside radiation pattern has a second angular range associated therewith that does not include the broadside direction, the second angular range encompassing angles not included in the first angular range and the first angular range encompassing angles not included in the second angular range.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An antenna system configured to provide a static composite radiation pattern, the static composite radiation pattern having a static broadside radiation pattern and a static off-broadside radiation pattern, the antenna system comprising:

a first antenna element configured to provide the static broadside radiation pattern, the static broadside pattern encompassing a broadside direction and having a maximum gain in the broadside direction;

a plurality of additional antenna elements configured in a pattern surrounding the first antenna element to provide a static off-broadside radiation pattern having a null coinciding with the broadside direction, the static broadside radiation pattern and the static off-broadside radiation pattern providing the static composite radiation pattern; and a scannable beamformer configured to feed the first antenna element and the plurality of additional antenna elements, the scannable beamformer being capable of scanning an array of antennas but configured to produce an unscanned donut radiation pattern surrounding the broadside direction.

2. The antenna system of claim 1, wherein the beamformer has directional beam steering capabilities.

3. The antenna system of claim 1, wherein the static off-broadside radiation pattern has a null in the broadside direction and the static broadside radiation pattern does not have a null in the broadside direction.

4. The antenna system of claim 1, wherein the static broadside radiation pattern has a first angular range associated therewith that includes the broadside direction, and the static off-broadside radiation pattern has a second angular range associated therewith that does not include the broadside direction, the second angular range encompassing angles not included in the first angular range and the first angular range encompassing angles not included in the second angular range.

5. The antenna system of claim 4, wherein the first angular range is defined by a first 3 dB half power point and the second angular range is defined by a second 3 dB half power point.

6. The antenna system of claim 1, wherein the first antenna element is a patch antenna element having a surface normal to the broadside direction.

7. The antenna system of claim 1, wherein at least one of the plurality of additional antenna elements is a patch antenna having a surface at an acute angle from the broadside direction.

8. The antenna system of claim 1, wherein the plurality of additional antenna elements are disposed to surround the first antenna element so that the static off-broadside radiation pattern is symmetrical about the broadside direction.

9. The antenna system of claim 1, wherein the static broadside radiation pattern is symmetrical about the broadside direction.

10. An antenna system configured to provide a fixed radiation pattern, the antenna system comprising:

a first antenna element configured to provide a peak gain in a broadside direction; and a plurality of additional antenna elements, each additional antenna element oriented and directional to have a peak gain in an off-broadside direction and a null coinciding with the broadside direction; and a scannable beamformer configured to feed the first antenna element and the plurality of additional antenna elements, the scannable beamformer being capable of scanning an array of antennas but configured to produce an unscanned donut radiation pattern surrounding the broadside direction.

11. The antenna system of claim 10, wherein the beamformer has directional beam steering capabilities.

12. The antenna system of claim 10, wherein the plurality of additional antenna elements are disposed to surround the first antenna element.

13. The antenna system of claim 10, wherein the first antenna element is a patch antenna and the plurality of additional antenna elements are monopole antenna elements.

14. The antenna system of claim 10, wherein the beamformer is configured to provide a signal to each of the plurality of additional antenna elements, each signal having a same amplitude and phase.

15. The antenna system of claim 10, further comprising a plurality of power amplifiers coupled to the beamformer, the beamformer configured to distribute power from the power amplifiers to the plurality of additional antenna elements and the first antenna element.

16. An antenna system for providing a fixed unscanned radiation pattern that is rotationally symmetric about a broadside direction and having a gain over an angular sector of greater than 120 degrees that includes the broadside direction, the antenna system comprising:

a broadside antenna element configured to provide a broadside radiation pattern with a higher gain in the broadside direction than a gain of the broadside antenna element at 120 degrees;

a scannable beamformer having beam scanning capabilities but configured to feed the broadside element and an array of additional antenna elements to provide a fixed rotationally symmetric off-broadside radiation pattern to extend coverage of the antenna system to the angular sector of greater than 120 degrees to produce an unscanned donut radiation pattern surrounding the broadside direction; and the array of additional antenna elements disposed around the broadside antenna element, each antenna element of the array of additional antenna elements having a directional radiation pattern pointed toward an off-broadside direction to produce a composite beam that has a donut pattern.

17. The antenna system of claim 16, wherein the beamformer feeds each antenna element of the array of additional antenna elements with a same phase and amplitude.

18. The antenna system of claim 16, wherein the fixed rotationally symmetric off-broadside radiation pattern has a null in the broadside direction and the broadside radiation pattern does not have a null in the broadside direction.

19. The antenna system of claim 16, wherein the broadside radiation pattern has a first angular range associated therewith that includes the broadside direction, and the fixed rotationally symmetric off-broadside radiation pattern has a second angular range associated therewith that does not include the broadside direction, the second angular range encompassing angles not included in the first angular range and the first angular range encompassing angles not included in the second angular range.

* * * * *